(12) United States Patent
Hsu

(10) Patent No.: US 9,200,667 B1
(45) Date of Patent: Dec. 1, 2015

(54) SUCTION CUP

(71) Applicant: Cheng-Chien Hsu, New Taipei (TW)

(72) Inventor: Cheng-Chien Hsu, New Taipei (TW)

( * ) Notice: Subject to any disclaimer, the term of this patent is extended or adjusted under 35 U.S.C. 154(b) by 0 days.

(21) Appl. No.: 14/476,011

(22) Filed: Sep. 3, 2014

(51) Int. Cl.
*A45D 42/14* (2006.01)
*F16B 47/00* (2006.01)
*F16M 13/02* (2006.01)

(52) U.S. Cl.
CPC .............. *F16B 47/00* (2013.01); *F16M 13/02* (2013.01)

(58) Field of Classification Search
CPC ... F16M 11/041; F16M 11/10; F16M 13/022; F16M 13/00; F16M 11/105; F16M 11/14; F16M 11/2064; F16M 13/02; F16B 47/006; F16B 47/00
USPC ............... 248/683, 537, 205.5, 205.8, 206.2, 248/206.3, 309.3, 362, 363, 467; 224/559; 294/64.1
See application file for complete search history.

(56) References Cited

U.S. PATENT DOCUMENTS

| | | | | |
|---|---|---|---|---|
| 2,315,566 | A * | 4/1943 | Watral et al. .................. | 211/123 |
| 4,951,909 | A * | 8/1990 | Russo et al. ................ | 248/206.2 |
| 6,131,865 | A * | 10/2000 | Adams ........................ | 248/206.2 |
| 6,244,778 | B1 * | 6/2001 | Chesbrough .................... | 403/51 |
| 6,550,735 | B1 * | 4/2003 | Zheng ........................... | 248/304 |
| 7,021,593 | B1 * | 4/2006 | Fan ............................ | 248/206.2 |
| 7,229,059 | B1 * | 6/2007 | Hood ............................ | 248/518 |
| 7,243,806 | B2 * | 7/2007 | Kwok ......................... | 211/105.3 |
| 7,661,638 | B2 * | 2/2010 | Yu ............................... | 248/205.8 |
| 7,793,899 | B2 * | 9/2010 | Fan ............................ | 248/206.2 |
| 8,104,809 | B1 * | 1/2012 | Mayhugh ...................... | 294/187 |
| 8,128,042 | B1 * | 3/2012 | Chen ......................... | 248/205.5 |
| 8,191,839 | B2 * | 6/2012 | Fan ............................ | 248/205.5 |
| 2004/0124325 | A1 * | 7/2004 | Kwok ......................... | 248/205.8 |
| 2007/0278369 | A1 * | 12/2007 | Yu ............................... | 248/205.8 |
| 2007/0290105 | A1 * | 12/2007 | Liu ............................ | 248/205.5 |
| 2008/0023602 | A1 * | 1/2008 | Bury ........................... | 248/205.8 |
| 2008/0302946 | A1 * | 12/2008 | Bury ............................ | 248/634 |
| 2010/0116954 | A1 * | 5/2010 | Fan ............................ | 248/205.8 |
| 2011/0297804 | A1 * | 12/2011 | Fan ............................ | 248/206.2 |
| 2011/0315839 | A1 * | 12/2011 | Chen ......................... | 248/205.8 |
| 2014/0197288 | A1 * | 7/2014 | Yang ........................... | 248/205.9 |
| 2014/0346295 | A1 * | 11/2014 | Song ........................... | 248/205.8 |
| 2014/0361136 | A1 * | 12/2014 | Smith et al. ................... | 248/363 |
| 2015/0108134 | A1 * | 4/2015 | Fangyuan ..................... | 220/483 |

\* cited by examiner

*Primary Examiner* — Jonathan Liu
*Assistant Examiner* — Muhammad Ijaz
(74) *Attorney, Agent, or Firm* — Lerner, David, Littenberg, Krumholz & Mentlik, LLP

(57) ABSTRACT

The invention is related to a suction cup which comprises a main body shell, a base plate, a resilient member, an actuating pin, a pushing block, an unlocking block, and a retaining pin. The main body shell comprises an upper compartment and a lower compartment. The base plate comprises a fixed rod, and the resilient member is mounted around the fixed rod. The base plate is inserted into the lower compartment of the main body shell. The pushing block comprises a space and is inserted into the upper compartment. The unlocking block comprises a notch and is inserted into the space. The actuating pin is inserted into the upper compartment of the main body shell and the space of the pushing block. The retaining pin is inserted into the notch of the unlocking block and the space of the pushing block.

11 Claims, 8 Drawing Sheets

SUCTION CUP

BACKGROUND OF THE INVENTION

1. Field of the Invention

The present invention relates to a suction cup, especially to a sucking disc with strong suction force and operated by pushing.

2. Description of the Prior Art

If people want to hang household goods such as clothes, case supporters, bathroom accessories, kitchen utensils on a wall, they have to nail hooks on the wall. To avoid damaging the wall, a suction cup is commonly used. Generally, the suction cup comprises a rubber, and users just need to press a center of the suction cup toward a wall so that the suction cup adhered to the wall. However, the suction cup comprising the rubber provides weak adherence to hang lighter household goods, such as the bathroom goods and the kitchen goods. Besides, the suction comprising the rubber cannot support the weight of a rod for being a pylon to hang heavier life goods, such as the clothes and the case supporters.

To overcome the shortcomings, the present invention provides a suction cup with a strong suction force, which can be operated easily to mitigate or obviate the aforementioned problems.

BRIEF SUMMARY OF THE INVENTION

The main objective of the invention is to provide a suction cup. The suction cup in accordance with the present invention has a main body portion and a control portion. The main body portion comprises a main body shell, a base plate, a resilient member, and an actuating pin. The main body shell comprises an upper compartment and a lower compartment. The base plate comprises a fixed rod, and the resilient member is passed through the fixed rod. The base plate is inserted into the lower compartment of the main body shell. The control portion comprises a pushing block, an unlocking block, and a retaining pin. The pushing block comprises a space and is inserted into the upper compartment of the main body shell. The unlocking block comprises a notch and is inserted into the space of the pushing block. The actuating pin is inserted into the upper compartment of the main body shell and the space of the pushing block. The retaining pin is inserted into the notch of the unlocking block and the space of the pushing block.

The present invention provides an easy-operated suction cup. Users just need to push the pushing block of the invention to allow the suction cup to adhere to a wall tightly, and push the unlocking block to allow the suction cup to detach from the wall.

DETAILED DESCRIPTION OF THE PREFERRED EMBODIMENTS

Figure 1:
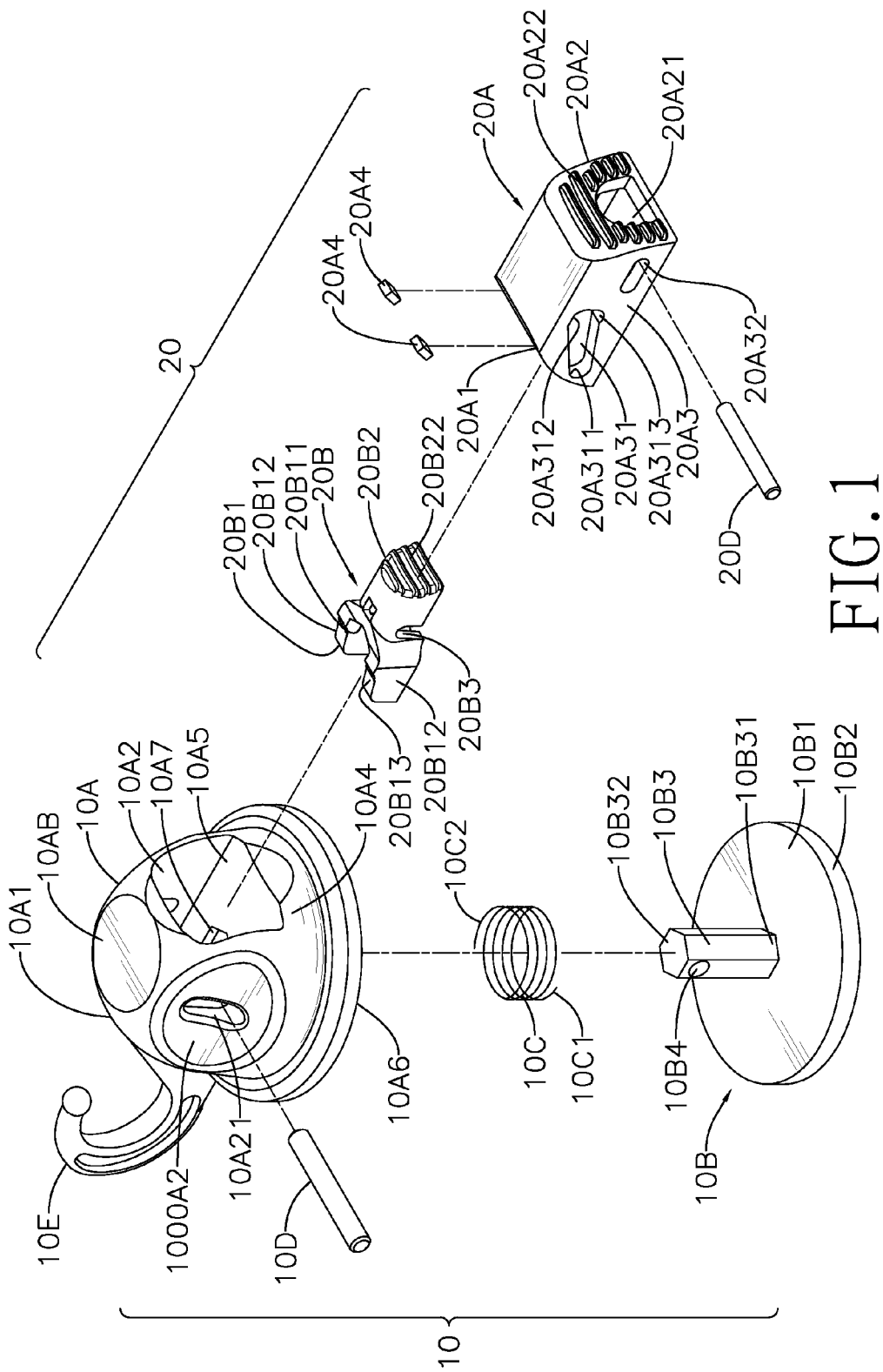
FIG. 1 is a perspective exploded view of a first embodiment of a suction cup in accordance with the present invention.

With reference to FIG. 1, in the first embodiment, a suction cup in accordance with the present invention comprises a main body portion 10, a control portion 20, an actuating pin 10D and a retaining pin 20D.

With reference to FIG. 1, the main body portion 10 is a semi-sphere and comprises a main body shell 10A, a base plate 10B, a resilient member 10C, and the actuating pin 10D.

The main body shell 10A comprises a top 10AB, a front end 10A1, two lateral sides 10A2, a back end 10A4, a partition 10A5, an upper compartment, a lower compartment, and a bottom circumference 10A6. The front end 10A1 comprises a hook 10E attached thereto. Each of the lateral sides 10A2 comprises a slot 10A21. The back end 10A4 of the main body shell 10A is opposite to the front end 10A1 of the main body shell 10A and is connected to the lateral sides 10A2 of the main body shell 10A.

Figure 2:
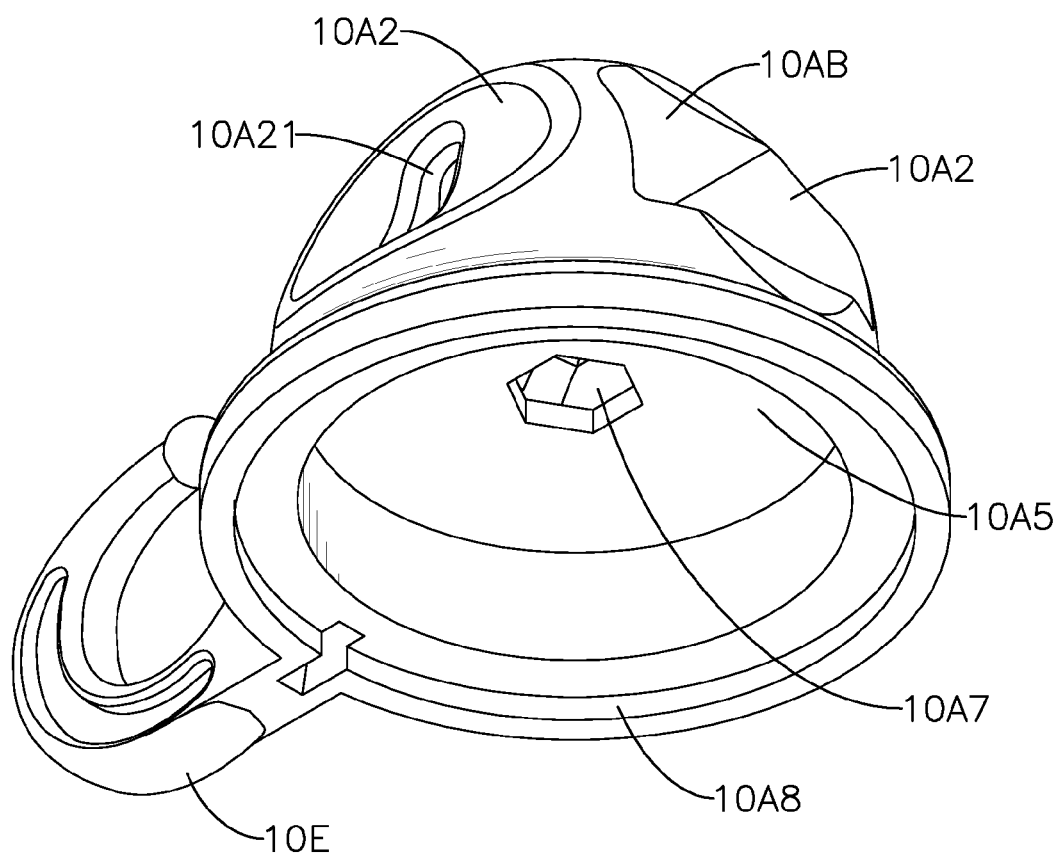
FIG. 2 is a perspective bottom view of a main body shell of the suction cup in FIG. 1.

With reference to FIG. 1 and FIG. 2, the partition 10A5 is positioned perpendicularly to the lateral sides 10A2 and below the slots 10A21, and comprises a central through hole 10A7. The upper compartment is surrounded by the top 10AB, the front end 10A1, and the lateral sides 10A2 of the main body shell 10A. The lower compartment is positioned below the upper compartment and surrounded by the partition 10A5, the front end 10A1, the lateral sides 10A2, and the back end 10A4.

The bottom circumference 10A6 is connected to the front end 10A1, the lateral sides 10A2 and the back end 10A4, and comprises an inner rim 10A8.

Figure 3:
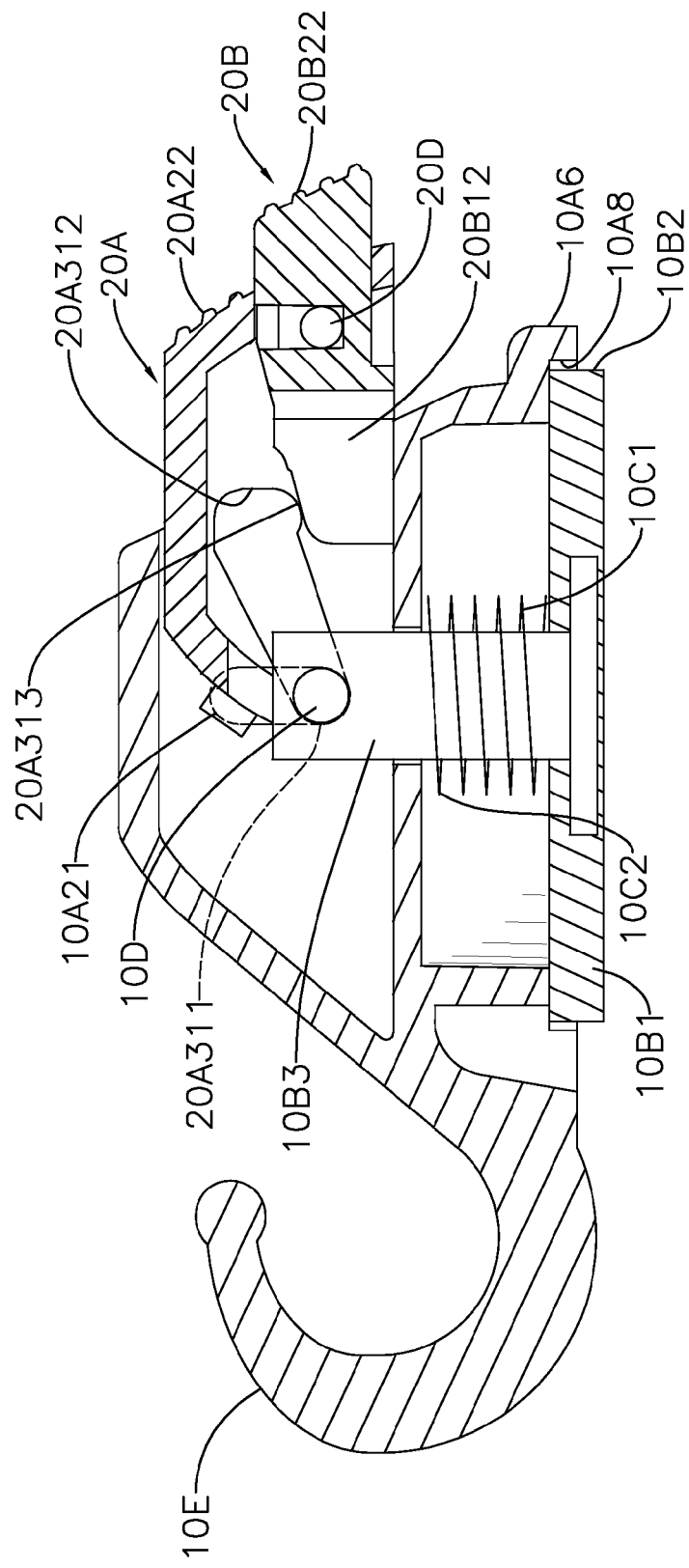
FIG. 3 is a cross-sectional side view of the suction cup in FIG. 1.

With reference to FIG. 1, the base plate 10B comprises a soft disk 10B1, a central part, an outer rim 10B2 and a fixed rod 10B3 at the bottom circumference. The soft disk 10B1 comprises a surface and a bottom. The bottom of the soft disk 10B1 is adhered to an object. The central part is located in the center of the soft disk 10B1. With reference to FIG. 1 and FIG. 3, the outer rim 10B2 of the base plate 10B fits into the inner rim 10A8 of the bottom circumference 10A6 of the main body shell 10A. The fixed rod 10B3 is formed on the central part of the soft disk 10B1, is inserted through the central through hole 10A7 of the partition 10A5 of the main body shell 10A, and comprises a proximal end 10B31, a distal end 10B32, and a via hole 10B4. The proximal end 10B31 is connected to the central part of the soft disk 10B1, and the distal end 10B32 is opposite to the proximal end 10B31. The via hole 10B4 is formed on the distal end 10B32 of the fixed rod 10B3.

With reference to FIG. 1 and FIG. 3, the resilient member 10C, being a spring in the present embodiment, is mounted around the fixed rod 10B3 of the soft disk 10B1 in the lower compartment of the main body shell 10A, and comprises a near end 10C1 and a far end 10C2. The near end 10C1 contacts the surface of the soft disk 10B1, and the far end 10C2 is opposite to the near end 10C1 and contacts the partition 10A5 of the main body shell 10A.

With reference to FIG. 1, the control portion 20 comprises a pushing block 20A and an unlocking block 20B. The pushing block 20A is embedded into the upper compartment of the main body shell 10A and comprises a front end 20A1, two lateral sides 20A3, two pads 20A4, a back end 20A2, and a space.

The lateral sides 20A3 of the pushing block 20A are connected with the front end 20A1 and the back end 20A2, and each side comprises an inclined slot 20A31 and a horizontal slot 20A32. Each of the lateral slots 20A31 is positioned close to and inclined toward the front end 20A1 of the pushing block 20A, and comprises a front portion 20A311 and a back portion 20A312. The front portion 20A311 is closed to the front end 20A1 of the pushing block 20A, and the back portion 20A312 is opposite to the front portion 20A311 of the inclined slot 20A31 and comprises a groove 20A313. The horizontal slots 20A32 are positioned close to the back end 20A2 of the pushing block 20A.

The two pads 20A4 are positioned on the front end 20A1 of the pushing block 20A to decrease impact force generated between the front end 20A1 of the pushing block 20A and the front end 10A1 of the main body shell 10 by embedding the pushing block 20A into the upper compartment of the main body shell 10A.

The back end 20A2 is opposite to the front end 20A1 and comprises an mounting recess 20A21 and embossed lines 20A22. The embossed lines 20A22 allow users to push the back end 20A2 of the pushing block 20A conveniently.

The space is formed inside the pushing block 20A, and is connected to the inclined slots 20A31 of the pushing block 20A, the horizontal slots 20A32 of the pushing block 20A, and the mounting recess 20A21.

With reference to FIG. 1 and FIG. 3, the unlocking block 20B is embedded into the space of the pushing block 20A, and comprises a front portion 20B1, a back portion 20B2, a central portion, and a bottom. The front portion 20B1 is U-shaped, and comprises a basal portion 20B11 and two lateral sides 20B12. The lateral sides 20B12 are laterally connected to the basal portion 20B11, and comprise inclines 20B13 decreased gradually away from the basal portion 20B11. The basal portion 20B11 and the lateral sides 20B12 surround the fixed rod 10B3 of the base plate 10B. The back portion 20B2 is opposite to the front portion 20B1 of the unlocking block 20B and is connected to the basal portion 20B11 of the front portion 20B1, and comprises embossed lines 20B22. The embossed lines 20B22 of the unlocking block 20B are convenient for users to push the unlocking block 20B.

The central portion is defined between the front portion 20B1 and the back portion 20B2 of the unlocking block 20B. The bottom is below the front portion 20B1 and the back portion 20B2, and comprises a notch 20B3 recessed on the central portion.

Figure 4:
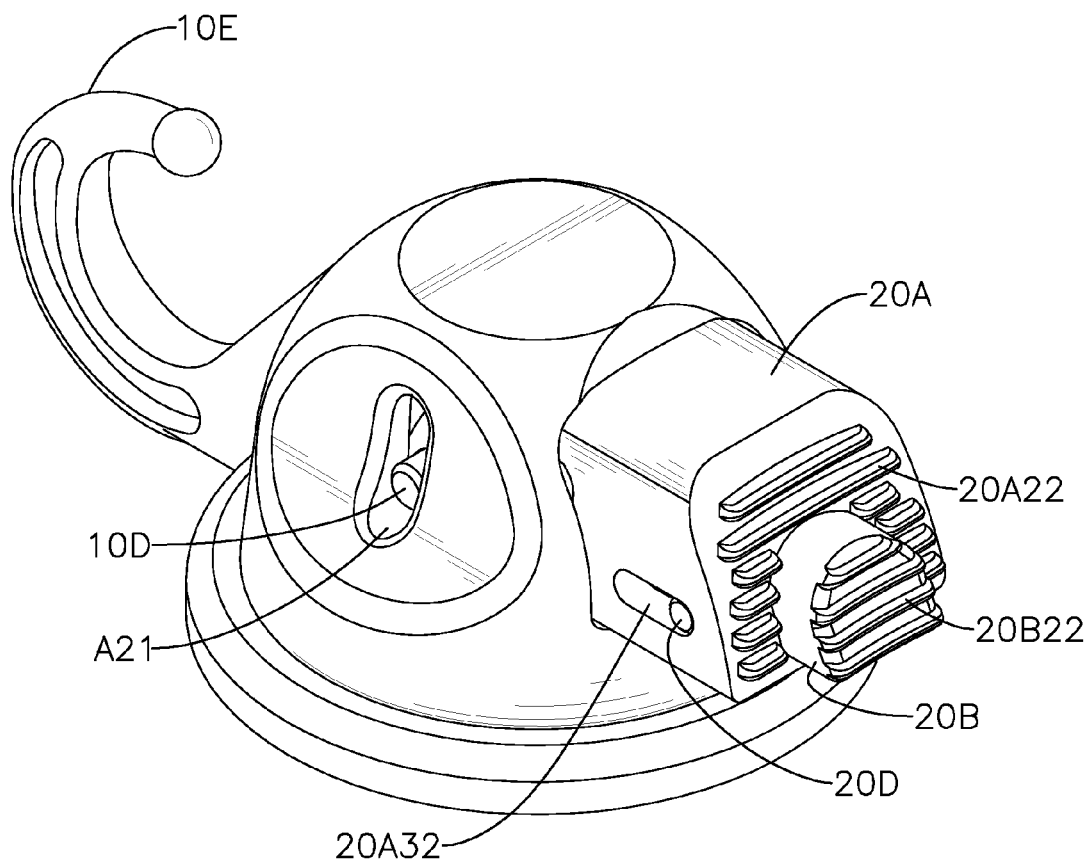
FIG. 4 is a perspective view of the suction cup in FIG. 1.

With reference to FIG. 3 and FIG. 4, the actuating pin 10D is inserted into the slots 10A21 of the main body shell 10A, the inclined slots 20A31 of the pushing block 20A, and the via hole 10B4 of the fixed rod 10B3. The actuating pin 10D is mounted in the front portion of the inclined slots 20A31, the horizontal slots 20A32 of the lateral sides of the main body shell 10A, and the notch 20B3 of the unlocking block 20B. The slots 10A21 prevent the actuating pin 10D from blocking between the front end 10A1 and the back end 10A4 of the main body shell 10A, and restrict the actuating pin 10D to move up and down.

With reference to FIG. 3 and FIG. 4, the retaining pin 20D is inserted into the horizontal slots 20A32 of the pushing block 20A, and the notch 20B3 of the unlocking block 20B. The retaining pin 20D is positioned close to the back end 20A2 of the pushing block 20A. The horizontal slots 20A32 of the pushing body 20A restrict the retaining pin 20D to move horizontally along with the unlocking block 20B.

Figure 5:
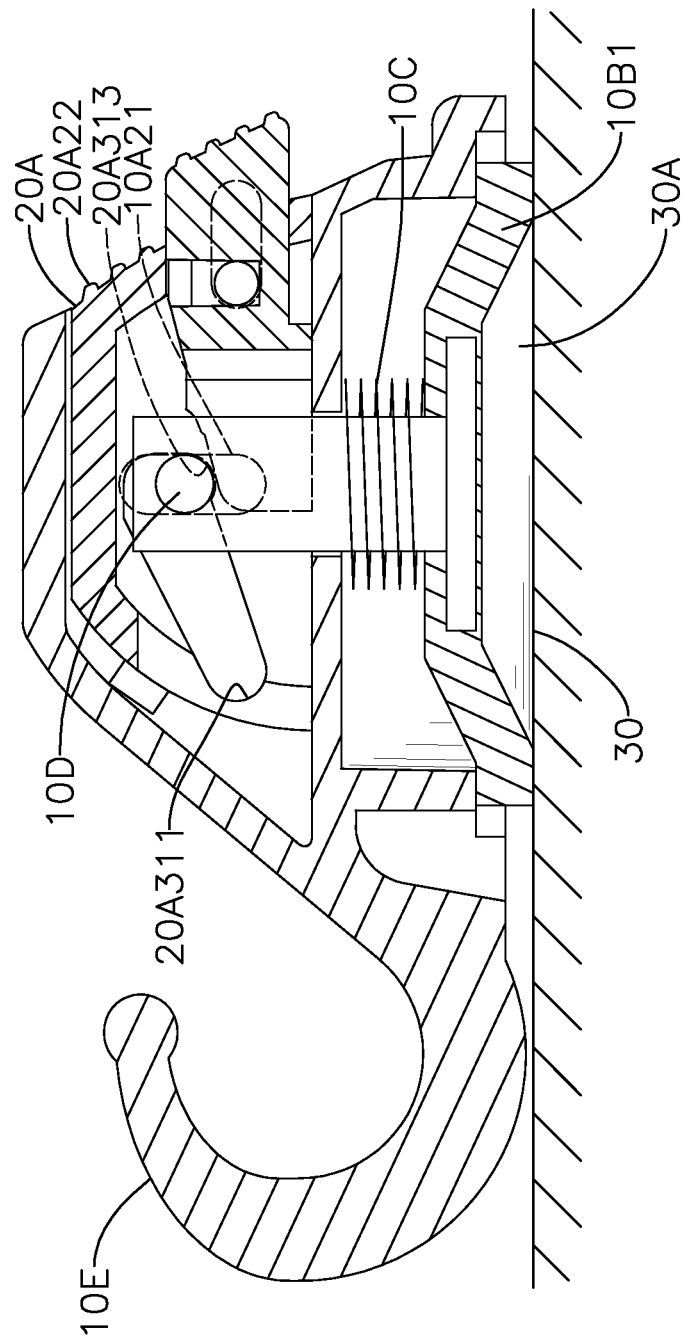
FIG. 5 is a cross-sectional operational side view of the suction cup in FIG. 1.

When the present invention is in use, with reference to FIG. 3 and FIG. 5, the soft disk 10B1 is attached to a flat surface 30, and the pushing block 20A is pushed into the upper compartment of the main body shell 10A to allow the actuating pin 10D to move from the front portions 20A311 of the inclined slots 20A31 of the pushing block 20A to the back portions 20A312 of the inclined slots 20A31 of the pushing block 20A. The actuating pin 10D remains in the grooves 20A313 of the inclined slots 20A31 of the pushing block 20A, and contacts the lateral sides 20B12 of the front portion 20B1 of the unlocking block 20B. In the meanwhile, the pushing block 20A is fixed in the compartment of the main body shell 10A, and the soft disk 10B1 is bent to form a vacuum space 30A between the soft disk 10B1 and the flat plane 30, and the lower compartment of the main body shell 10A is compressed. Therefore, the suction cup is adhered on the flat surface 30 tightly, and objects can be hung on the hook 10E of the main body shell 10A.

With reference to FIG. 5, pushing the unlocking block 20B into the space of the pushing block 20A allows the lateral sides 20B12 of the front portion 20B1 of the unlocking block 20B to push the actuating pin 10D to leave the grooves 20A313 of the lateral inclined slots 20A31 of the pushing block 20A. In the meanwhile, the resilient member 10C provides force to push the soft disc 10B1 toward the flat surface 30, allowing releasing vacuum status within the vacuum space 30A. Therefore, the suction cup is easily removed from the flat surface 30.

The suction cup of the invention can be adhered to the flat surface 30 tightly, and it is convenient to users to operate.

Figure 6:
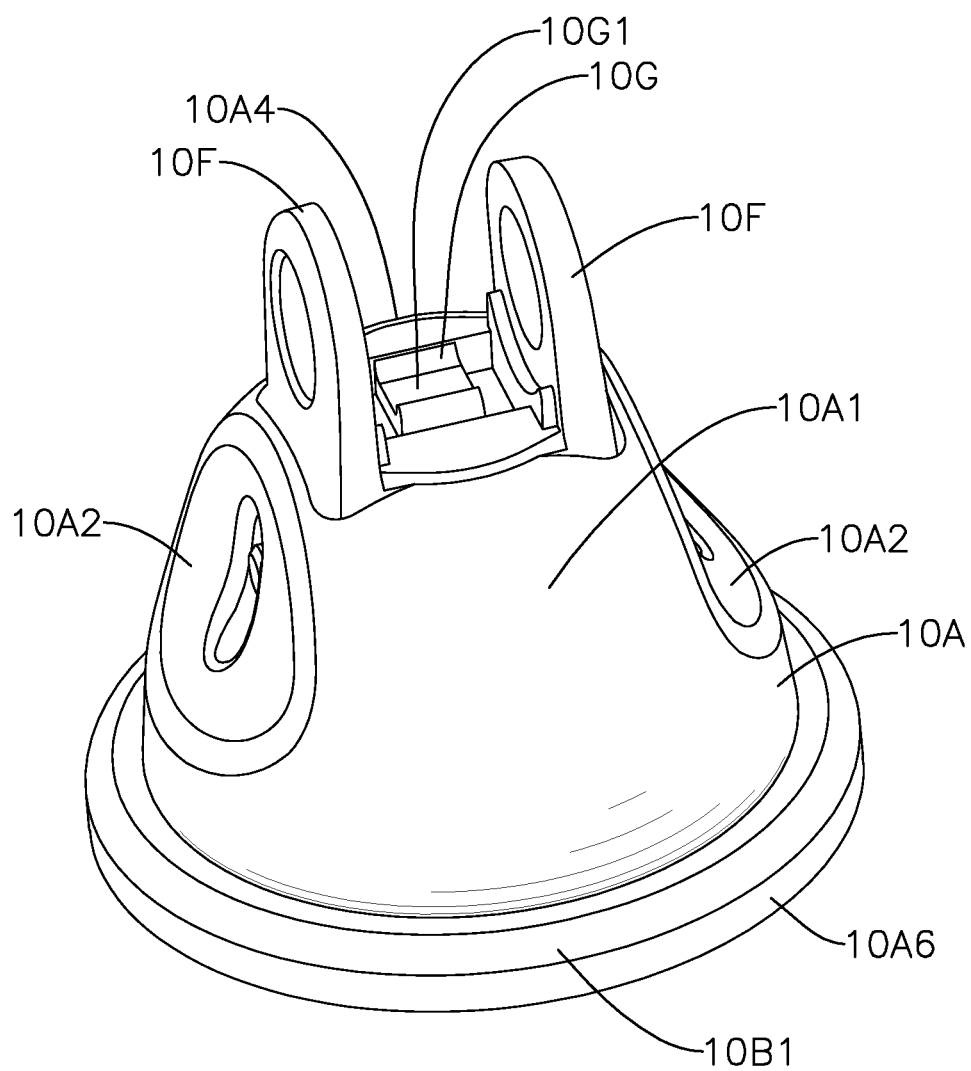
FIG. 6 is a perspective view of a second embodiment in accordance with the present invention.

With reference to FIG. 1, FIG. 5 and FIG. 6, the second embodiment is similar to the first embodiment, wherein the main body shell 10A further comprises two fixing collars 10F and a protrusion 10G on the top of the main body shell 10A, instead of the hook 10E formed on the front end of the main body shell 10A. Each of the two fixing collars 10F is parallel to the lateral sides 10A2 of the main body shell 10A, and the protrusion 10G is formed between the two fixing collars and comprises a concave groove 10G1.

Figure 7:
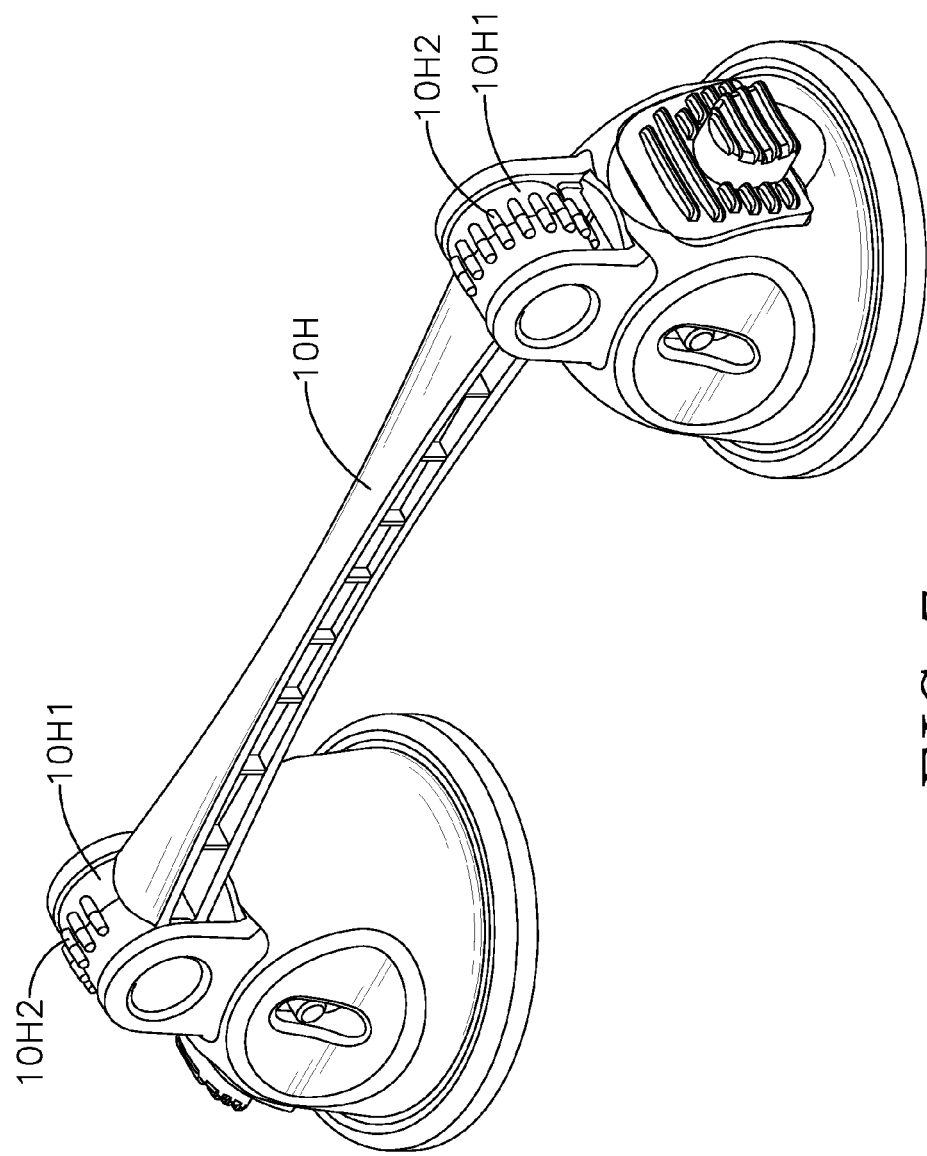
FIG. 7 is a perspective operational view of two suction cups in FIG. 6 used in cooperation.

With reference to FIG. 7, a rod 10H comprises two fixed ends 10H1 and multiple projections 10H2. The multiple projections 10H2 are formed surrounding the two fixed ends 10H1 of the rod 10H. The two fixed ends 10H1 of the rod 10H are fixed into the two fixing collars 10F of the main body shell 10A, and one of the multiple projections 10H2 is anchored into the concave groove 10G1 of the protrusion 10G.

As the invention is in use, users can adhere two suction cups of the invention on two different planes by rotating one of the main body shells 10A, and fix the two suction cups by anchoring one of the multiple projections 10H2 into the concave groove 10G1. Various objects can be hung on the pod 10H stably.

Figure 8:
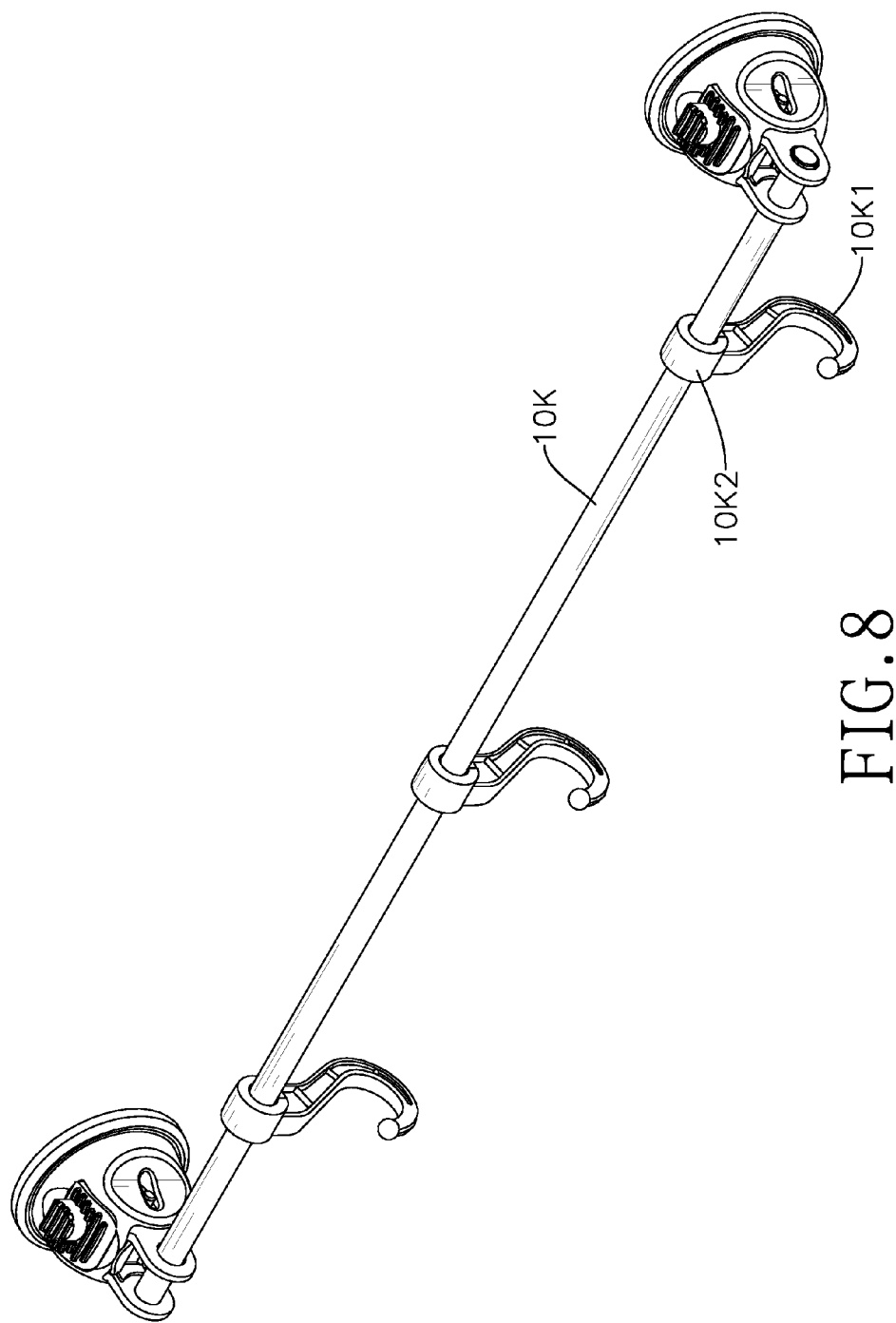
FIG. 8 is an operational view of a third embodiment of the suction cups in FIG. 6.

With reference to FIG. 8, the third embodiment is similar to the second embodiment, and comprises a smooth rod 10K and multiple hooks 10K1. One of the hooks 10K comprises a shackle 10K2, and the shackle 10K2 is mounted around the smooth rod 10K.

For operating the invention, users can adhere the two suction cups of the invention on the same plane, and hang objects on the smooth rod 10K and the hooks 10K1.

The invention claimed is:
1. A suction cup comprising:
   a main body portion, comprising
      a main body shell comprising
         a top,
         a front end connected to the top,
         two lateral sides connected to the front end and the top, and each lateral side comprising a slot,
         a back end opposite to the front end and connected to the lateral sides, a partition positioned perpendicularly to the lateral sides and below the top and the slots, and comprising a central through hole, an upper compartment surrounded by the top, the front end, the lateral sides, and the partition, a lower compartment positioned below the upper compartment, and surrounded by the partition, the front end, the lateral sides, and the back end, and a bottom circumference connected to the front end, the lateral sides and the back end, and comprising an inner rim;

a base plate comprising
  a soft disk,
  a central part located in the center of the soft disk,
  an outer rim fit into the inner rim of the bottom circumference of the main body shell,
  a fixed rod formed on the central part of the soft disk and inserted through the central through hole of the main body shell, and comprising:
    a proximal end connected to the central part of the soft disk,
    a distal end opposite to the proximal end, and
    a via hole formed on the distal end;

a resilient member mounted around the fixed rod of the soft disk, and comprising
  a near end contacting the soft disk, and
  a far end opposite to the near end and contacting the main body shell;

a control portion having
  a pushing block embedded into the upper compartment of the main body shell, and comprising:
    a front end,
    a back end opposite to the front end of the pushing block, and comprising a mounting recess, two lateral sides connected with the front end and back end of the pushing block, and each side of the pushing block comprising:
      a horizontal slot disposed close to the back end of the pushing block, and
      an inclined slot disposed close to the front end of the pushing block and inclined toward the pushing block, and
      each inclined slot comprising:
        a front portion close to the front end of the pushing block, and
        a back portion opposite to the front portion of the inclined slot, and comprising a groove, and
    a space formed inside the pushing block, and connected to the inclined slots and the horizontal slots of the pushing block and the mounting recess;

an unlocking block embedded into the space of the pushing block, and comprising:
    a front portion in a U-shape, and comprising:
      a basal portion, and
      two lateral sides laterally connected to the basal portion, and comprising inclines decreased gradually away from the basal portion,
    a back portion opposite to the front portion of the unlocking block and connected to the basal portion,
    a central portion defined between the front portion and the back portion of the unlocking block, and
    a bottom below the front portion and the back portion of the unlocking block, and comprising a notch recessed on the central portion;
  an actuating pin inserted into the slots of the main body shell, the inclined slots of the pushing body, and the via hole of the fixed rod; and
  a retaining pin inserted into the horizontal slots of the pushing block and the notch of the unlocking block.

2. The suction cup as claimed in claim 1, wherein the pushing block further comprises at least one pad located on the front end of the pushing block.

3. The suction cup as claimed in claim 1, wherein the main body portion further comprises a hook on the front end of the main body shell.

4. The suction cup as claimed in claim 3, wherein the main body portion is a semi-sphere and comprises a cylindrical bottom.

5. The suction cup as claimed in claim 1, wherein the main body portion further comprises two fixing collars formed on the top of the main body shell and each of the two fixing collars is parallel to the lateral sides of the main body shell.

6. The suction cup as claimed in claim 5, wherein the main body portion further comprises a protrusion formed between the two fixing collars.

7. The suction cup as claimed in claim 6, wherein the protrusion comprises a concave groove.

8. The suction cup as claimed in claim 6, wherein the main body portion is a semi-sphere and comprises a cylindrical bottom.

9. The suction cup as claimed in claim 1, wherein the control portion further comprises embossed lines on the back end of the pushing block.

10. The suction cup as claimed in claim 9, wherein the control portion further comprises embossed lines on the back end of the unlocking block.

11. The suction cup as claimed in claim 10, wherein the control portion further comprises two pads on the front end of the pushing block.

* * * * *